United States Patent [19]
Ikeya et al.

[11] Patent Number: 6,052,340
[45] Date of Patent: *Apr. 18, 2000

[54] TURNTABLE FOR OPTICAL RECORDING DISC RECORDING APPARATUS

[75] Inventors: Tomoyoshi Ikeya; Naoki Okuyama, both of Nakakoma-gun, Japan

[73] Assignees: Pioneer Electronic Corporation, Tokyo; Pioneer Video Corporation, Yamanashi, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,539

[22] Filed: May 20, 1997

[30] Foreign Application Priority Data

May 23, 1996 [JP] Japan ..................... 8-151612

[51] Int. Cl.$^7$ ....................................... G11B 11/00
[52] U.S. Cl. ............................. 369/13; 360/114
[58] Field of Search ............... 369/14, 13, 275.3, 369/275.2, 275.4, 32, 110, 44.37, 44.38; 360/114, 59, 103, 102

[56] References Cited

U.S. PATENT DOCUMENTS 5,572,491  11/1996  Karibe et al. ..................... 369/13

*Primary Examiner*—Ali Neyzari
*Attorney, Agent, or Firm*—Perman & Green, LLP

[57] ABSTRACT

An optical mother disc recording apparatus is disclosed, which can effectively solve problems including a decrease in film thickness and the like and can be miniaturized. The optical mother disc recording apparatus comprises a turntable for supporting an optical mother disc having a transparent substrate on which a photoresist layer is formed; a motor for rotating and driving the turntable; and optical means for irradiating a laser beam modulated by an information signal onto the optical mother disc, wherein the transparent substrate has a thickness within the range from 0.4 mm to 4.0 mm and a diameter within the range from 70 mm to 400 mm, and the turntable is capable of being in contact with an area on the inside and/or outside of a recording area of the optical mother disc. The outermost radius of the turntable is smaller than the innermost radius of the recording area of the optical mother disc.

5 Claims, 4 Drawing Sheets

TURNTABLE FOR OPTICAL RECORDING DISC RECORDING APPARATUS

BACKGROUND OF THE INVENTION

1. Field of the Invention

This invention relates to an optical mother disc recording apparatus.

2. Related Background Art

FIG. 1 shows an example of a conventional optical mother disc recording apparatus. Reference numeral 32 denotes an optical mother disc optical mastering disc. The mother disc 32 comprises a glass substrate 33 and a positive-type photoresist layer 34 coated thereon. A turntable 30 carries the mother disc 32 by means of a vacuum adsorption technique (not shown). The turntable 30 is rotated by a spindle motor 31. Thus, a laser beam modulated by information signals moves along the radial direction of the rotating mother disc 32, and irradiates the photoresist layer 34 on the mother disc 32, so that the photoresist layer 34 is exposed.

An optical system of the above apparatus comprises a fixed optical system 10 and a movable optical system 20. The fixed optical system 10 comprises a light source 11 including a laser source such as an Ar gas laser, a reflecting mirror 12, a condenser lens 13, an A/O modulator 14 and an A/O modulator driving circuit 15 for modulating a laser beam in accordance with an information signal, a collimating lens 16, and a reflecting mirror 17. The moving optical system 20 comprises a concave lens 21, a collimating lens 22, a reflecting mirror 23, and an objective lens 24.

A glass plate having a diameter of or more than 200mm and a thickness within the range from 6 to 8 mm is used as a glass substrate of the optical mother disc, because it is easy to grind the glass substrate and to achieve a mechanical strength required for the mother disc. Since the glass substrate has a large size and a large amount of weight, a large size of a spindle motor is required for rotating at a high speed. In order to assure a large enough adsorption area and an adequate support of the mother disc, an outer radius R3 of the turntable has to be larger than an innermost radius R1 (R1<R2) of a recording area A of the optical mother disc 32.

In an area B which has a ring shape having a width of (R3−R1) in the recording area A of the optical mother disc 32, a laser beam which impinges on the photoresist layer 34 enters the glass substrate, and is then reflected by the upper surface of the turntable 30, and the reflection light partially again enters the photoresist layer 34 to expose the photoresist layer 34 twice. Therefore, after the development of the photoresist layer, problems including the decrease in thickness of the film, the transfer of a groove for adsorption arise in the photoresist layer 34 of the area B.

An object of the invention is to overcome the foregoing drawbacks and to provide an optical mother disc recording apparatus which can effectively solve the problems such as the decrease in thickness of film, the transfer of a groove for adsorption, and which has a smaller dimensions.

SUMMARY OF THE INVENTION

The present invention provides an optical mother disc recording apparatus comprising: a turntable for supporting an optical mother disc having a transparent substrate on which a photoresist layer is formed; a motor for rotating and driving said turntable; and optical means for irradiating a laser beam modulated by an information signal onto said optical mother disc, wherein said transparent substrate has a thickness from 0.4 mm to 4.0 mm and a diameter from 70 mm to 40 mm, and said turntable is in contact with said optical mother disc in areas corresponding to an internal area and/or an external area with respect to a recording area of said optical mother disc.

It is also within the scope of the invention that the turntable has a smaller outermost radius than an innermost radius of the recording area of the optical mother disc.

As mentioned above, the optical mother disc recording apparatus is provided, so that the thinner transparent substrate may be used, and the turntable comes into contact with an area except the recording area in the optical mother disc. Accordingly, an influence caused by the light reflected with the turntable can be eliminated. The setting the outermost radius of the turntable smaller than the innermost radius of the recording area of the optical mother disc causes the size of the apparatus to be reduced.

The optical mother disc recording apparatus of the invention can take the advantages that not only the problems including decrease in thickness of film by a halation generated in the recording area can be solved, but also a distortion of the optical mother disc generated by its adsorption including a distortion in the recording area can be prevented. Since a rotary member has a smaller inertia, a load of the spindle motor can be decreased, therefore, the apparatus can be applied to a high speed rotation recording.

DETAILED DESCRIPTION OF THE PREFERRED EMBODIMENTS

Figure 1:
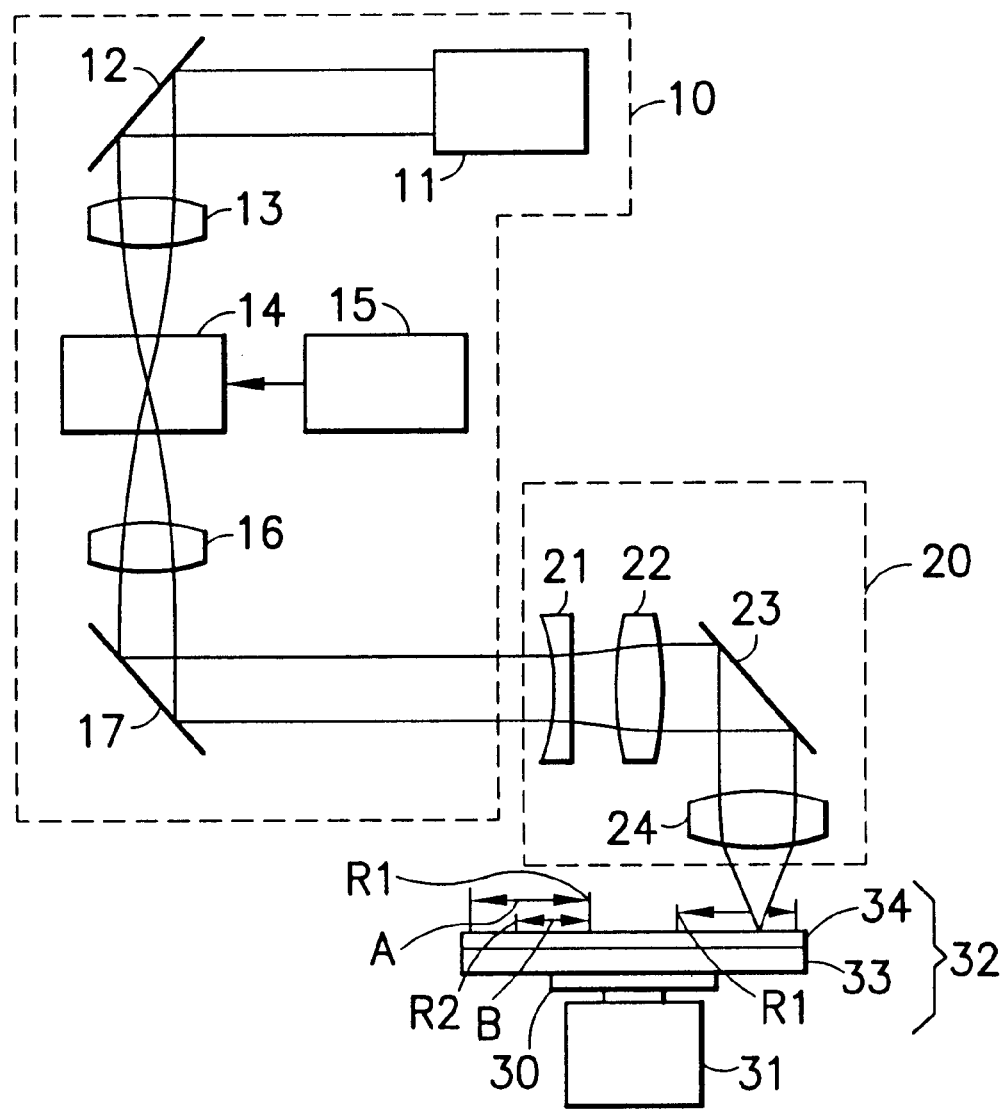
FIG. 1 is a diagram showing a conventional optical mother disc recording apparatus.
Figure 2A:
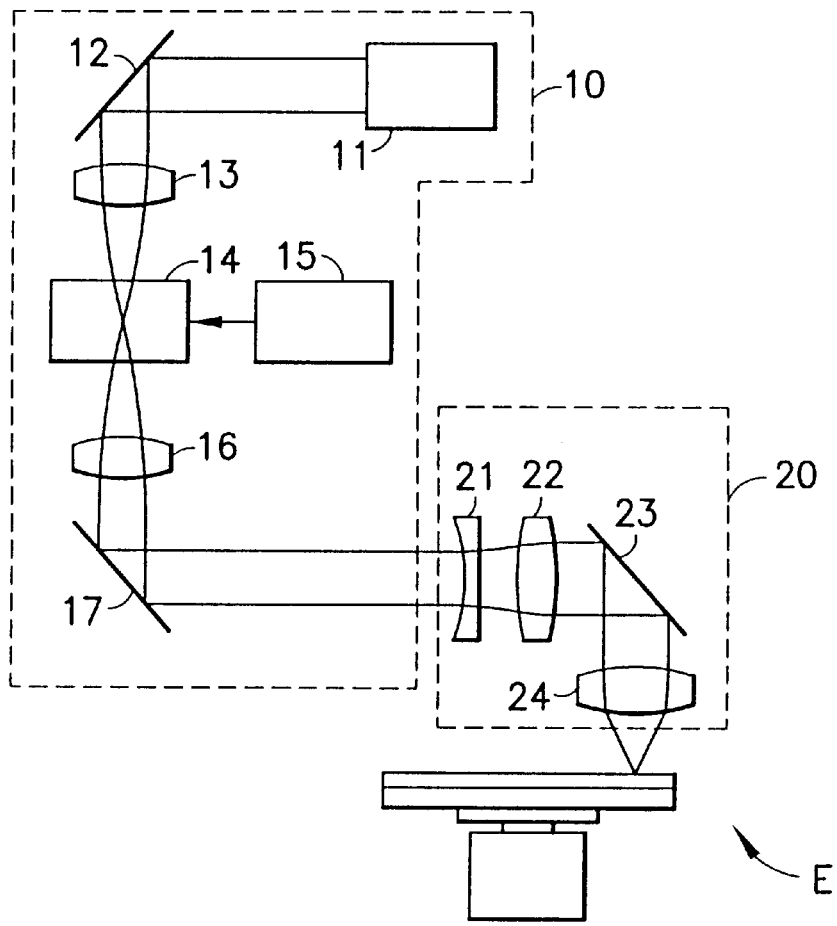
FIG. 2A is a diagram showing one embodiment of an optical mother disc recording apparatus according to the invention.

A preferred embodiment of the invention will now be described hereinbelow. FIG. 2A is a diagram showing an optical mother disc recording apparatus according to the present invention. A fixed optical system 10 and a movable optical system 20 in an optical system have the same construction as those of the conventional optical system. That is, the optical system consists of the fixed optical system 10 and a movable optical system 20. The fixed optical system 10 comprises a laser light source 11 including an Ar gas laser or the like; a reflecting mirror 12; a condenser lens 13; an A/O modulator 14 with an A/O modulator driving circuit 15 for modulating a laser beam in accordance with an information signal; a collimating lens 16; and a reflecting mirror 17. The movable optical system 20 consists of a concave lens 21, a collimating lens 22, a reflecting mirror 23, and an objective lens 24. A symbol E in FIG. 2A indicates an assemble including an optical mother disc 32 having a glass substrate on which a positive-type photoresist layer is formed, a turntable 30a, and a spindle motor 31.

Figure 2B:
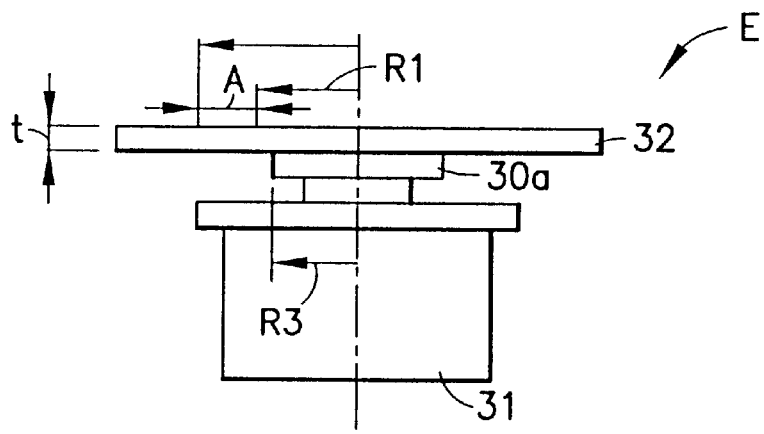
FIG. 2B is a side view of the optical mother disc recording apparatus of FIG. 2A.

As seen in FIG. 2B, the turntable 30a has a radius R3 which is set to be smaller than an innermost radius R1 of a recording area A of the optical mother disc 32. The apparatus comprising the turntable 30a having a small absorption area whose diameter R3 is shorter than the length of R1 and the small spindle motor 31 can be realized by using the thinner optical mother disc 32 having a thickness (t) within a range from 0.4 mm to 4.0 mm.

Figure 3A:
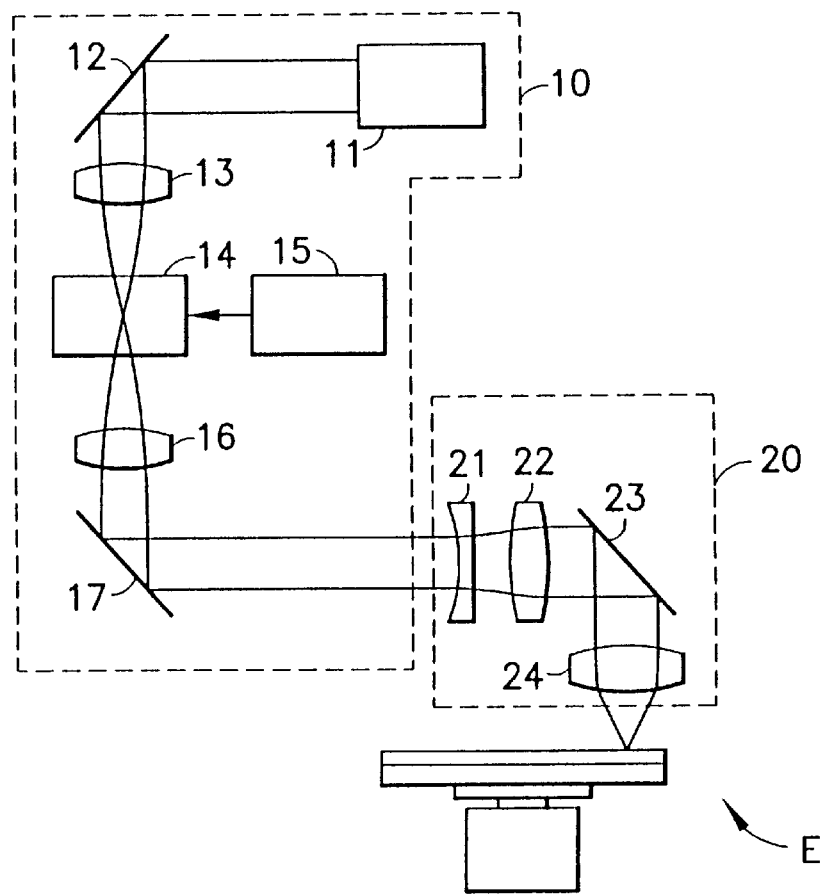
FIG. 3A is a diagram showing another embodiment of an optical mother disc recording apparatus according to the invention.
Figure 3B:
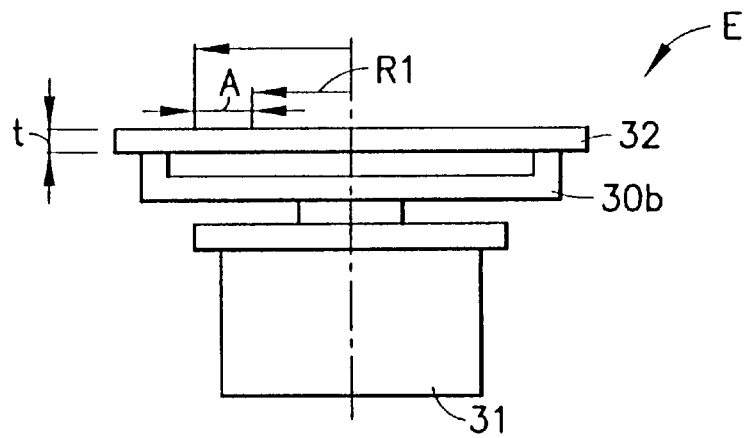
FIG. 3B is a side view of the optical mother disc recording apparatus of FIG. 3B.
Figure 4A:
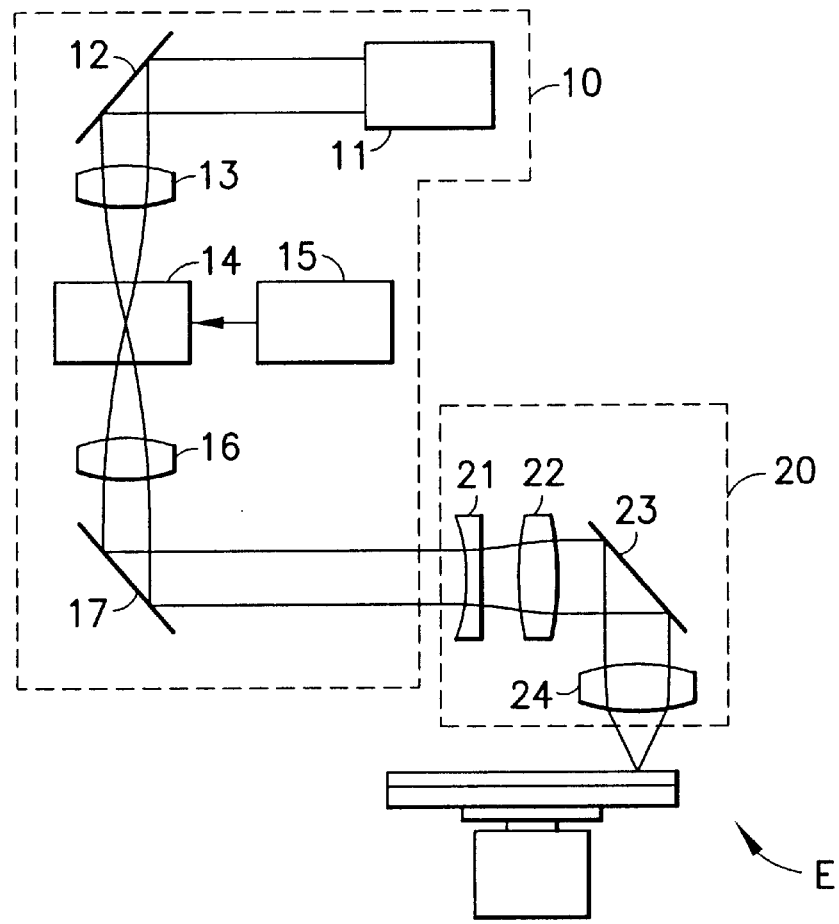
FIG. 4A is a diagram showing further embodiment of the optical mother disc recording apparatus according to the invention.
Figure 4B:
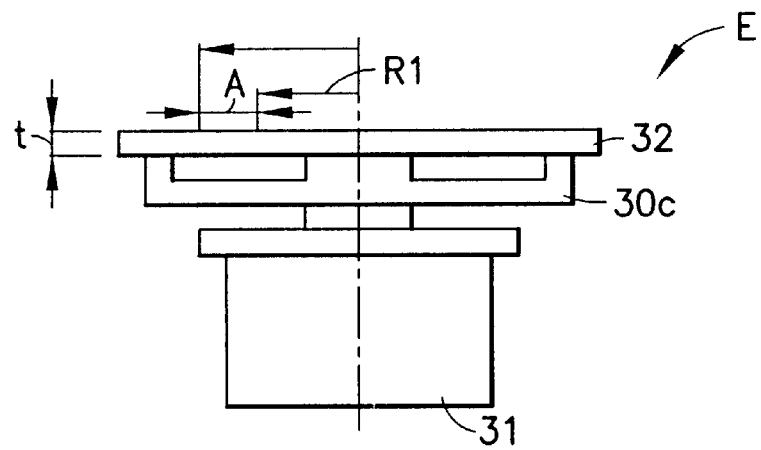
FIG. 4B is a side view of the optical mother disc recording apparatus of FIG. 4A.

FIGS. 3A and 3B show an optical mother disc recording apparatus in which a area for the absorption of the mother disc to the turntable is provided outside of the recording area and the optical mother disc 32 is positioned away from a turntable inside of the recording area. FIGS. 4A and 4B show an optical mother disc recording apparatus in which the adsorption of the mother disc to the turntable is performed outside and inside of the recording area, or one of the outside and inside sections of the recording area is provided for the absorption of the mother disc to the turntable, and the other is provided for the support of the mother disc, in any case, the recording area in the mother disc is positioned away from the turntable. Accordingly, a distortion of the optical mother disc is suppressed, a halation can be made uniform in the recording area, and a deterioration such as a decrease in a film thickness or the like can be made uniform in the mother disc.

The above configuration causes the optical mother disc to reduce its thickness, further the spindle motor and turntable can be miniaturized. Even if a diameter of the turntable is smaller than the innermost diameter of the recording area of the optical mother disc, an adsorbing force strong enough to hold the thinner optical mother disc rotating at a high speed can be obtained.

An optical disc having a disc diameter of 12 cm, such as a CD (compact disc), a CD-ROM, and a DVD (digital video disc) has the innermost and outermost radii of the recording area which are set to substantially 23 mm and 58 mm respectively. In case of an LD (laser disc), since the disc diameter is equal to 30 cm or 20 cm, the innermost and outermost radii of the LD are different from those of the CD. Generally, the recording area of the disc includes a lead-in area, a program area, and a lead-out area, so that the turntable can also be constructed in the manner that the turntable comes into contact with the lead-in and lead-out areas of the disc. That is, the turntable can be constructed in a manner that the recording area A corresponds to the program area comes into contact with the turntable on the inside or outside of the program area and is supported.

Although the invention has been described above with respect to the optical mother disc, so long as the optical mother disc has a thinner plate shape, it can be similarly constructed for a semiconductor wafer or the like. However, in the case of the semiconductor wafer, there is no need to prevent a halation.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An optical mastering disc recording apparatus for recording an information signal on an optical mastering disc, said optical mastering disc comprising a transparent substrate having a plurality of surfaces and a photoresist layer provided on one of the surfaces of said substrate, said optical mastering disc including a ring-shaped recording area on said one of the surfaces in which the information signal is recorded, said apparatus comprising:

a turntable for carrying an optical mastering disc thereon;

a motor for rotating and driving said turntable; and optical means for irradiating a laser beam modulated by an information signal onto the recording area of said optical mastering disc, wherein said turntable is configured to be in contact with only a predetermined portion of the other surface of said substrate, said predetermined portion is opposite to a non-recording area located other than the recording area so as to prevent a laser beam reflected from said turntable from returning to said photoresist layer.

2. An apparatus according to claim 1, wherein an outermost radius of said turntable is smaller than an innermost radius of the recording area of said optical mastering disc, wherein the turntable is in contact with a predetermined portion of the other surface of said optical mastering disk, said predetermined portion is opposite to a non-recording area located radially inwardly of the recording area.

3. An apparatus according to claim 1, wherein the turntable is configured to be in contact only with two areas on the other surface, said areas are opposite to non-recording areas located radially inwardly and outwardly of the recording area, thereby providing a gap between the turntable and a portion on the other surface of the substrate opposite to the recording area.

4. An apparatus according to claim 1, wherein said transparent substrate has a thickness within the range from 0.4 mm to 4.0 mm and a diameter within the range from 70 mm to 400 mm.

5. An optical mastering disc recording apparatus for recording an information signal on an optical mastering disc comprising a transparent substrate having a plurality of surfaces and a photoresist layer provided on one of the surfaces of said substrate, said optical mastering disc including a ring-shaped recording area on one of the surfaces in which the information signal is recorded, said apparatus comprising:

a turntable for carrying an optical mastering disc thereon;

a motor for rotating and driving said turntable; and optical means for irradiating a laser beam modulated by an information signal onto the recording area of said optical mastering disc, said turntable includes a recess on a contact surface with said optical mastering disk, wherein when the turntable supports the disk, a gap is provided between said recess and a predetermined portion of the other surface of the substrate opposite to the recording area.

* * * * *

UNITED STATES PATENT AND TRADEMARK OFFICE
CERTIFICATE OF CORRECTION

PATENT NO. : 6,052,340
DATED : 4/18/00
INVENTOR(S) : Tomoyoshi Ikeya; Naoki Okuyama It is certified that error appears in the above-identified patent and that said Letters Patent is hereby corrected as shown below:

On the cover page of patent no. 6,052,340, the inventors residence was incorrectly listed, "Nakakoma-gun" should read --Yamanashi--.

Signed and Sealed this

Twenty-seventh Day of March, 2001

Attest:

NICHOLAS P. GODICI

*Attesting Officer*  *Acting Director of the United States Patent and Trademark Office*